(12) United States Patent
Wang et al.

(10) Patent No.: US 12,004,077 B2
(45) Date of Patent: Jun. 4, 2024

(54) METHOD, DEVICE AND COMPUTER READABLE MEDIUM FOR SERVICE CHAIN

(71) Applicant: NOKIA TECHNOLOGIES OY, Espoo (FI)

(72) Inventors: Zhi Wang, Shandong (CN); Yigang Cai, Naperville, IL (US); Yang Shen, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 376 days.

(21) Appl. No.: 17/438,750

(22) PCT Filed: Mar. 12, 2019

(86) PCT No.: PCT/CN2019/077863
§ 371 (c)(1),
(2) Date: Sep. 13, 2021

(87) PCT Pub. No.: WO2020/181496
PCT Pub. Date: Sep. 17, 2020

(65) Prior Publication Data
US 2022/0150810 A1    May 12, 2022

(51) Int. Cl.
*H04W 4/50* (2018.01)
*H04W 40/12* (2009.01)
(Continued)

(52) U.S. Cl.
CPC .............. *H04W 48/18* (2013.01); *H04W 4/50* (2018.02); *H04W 40/12* (2013.01); *H04W 40/24* (2013.01)

(58) Field of Classification Search
CPC ....... H04W 48/18; H04W 4/50; H04W 40/12; H04W 40/24; H04W 4/24; H04W 80/12;
(Continued)

(56) References Cited

U.S. PATENT DOCUMENTS 10,063,415 B1    8/2018  Kanakarajan
2016/0337206 A1  11/2016  Bugenhagen et al.
(Continued)

FOREIGN PATENT DOCUMENTS

| CN | 107332913 A | 11/2017 | |
|---|---|---|---|
| CN | 108260169 A | 7/2018 | |
| EP | 3288325 A1 * | 2/2018 | ......... H04L 12/1407 |

OTHER PUBLICATIONS

International Search Report and Written Opinion dated Oct. 30, 2019 corresponding to International Patent Application No. PCT/CN2019/077863.
(Continued)

*Primary Examiner* — Huy C Ho
(74) *Attorney, Agent, or Firm* — SQUIRE PATTON BOGGS (US) LLP

(57) ABSTRACT

A method, device and computer readable medium for service chain is provided. Dynamic service chain is achieved and the service chain request is transmitted from the application. The device determines the service chain based on a profile of the application. Further, implicit service chain subscribing is also achieved. Thus, a more flexible service chain is achieved. Further, management of service chain related to NF service is also achieved.

20 Claims, 12 Drawing Sheets

(51) Int. Cl.
*H04W 40/24* (2009.01)
*H04W 48/18* (2009.01)

(58) Field of Classification Search
CPC ....... H04L 12/14; H04M 15/00; H04M 15/80; H04M 15/83; H04M 15/85; H04M 15/851; H04M 15/852; H04M 15/854; H04M 15/88; H04M 15/888
USPC .......................................................... 370/329
See application file for complete search history.

(56) References Cited

U.S. PATENT DOCUMENTS

| | | |
|---|---|---|
| 2017/0101629 A1 | 7/2017 | Li et al. |
| 2017/0237819 A1 | 8/2017 | Qiu et al. |
| 2017/0250902 A1* | 8/2017 | Rasanen ................. H04L 41/50 |
| 2018/0262431 A1* | 9/2018 | Zhang .................... H04L 47/20 |

OTHER PUBLICATIONS

Indian Office Action corresponding to IN Appln. No. 202147045462, dated Mar. 10, 2022.
European Search Report dated Oct. 12, 2022, corresponding to European Patent Application No. 19919362.4.

* cited by examiner

METHOD, DEVICE AND COMPUTER READABLE MEDIUM FOR SERVICE CHAIN

FIELD

Embodiments of the present disclosure generally relate to communication techniques, and more particularly, to methods, devices and computer readable medium for service chain.

BACKGROUND

In recent communication networks, a new technology of service chain has been proposed. The service chain is an emerging set of technologies and processes that enable operators to configure network service dynamically in software without having to make change to the network at hardware level. By routing traffic according to a "service graph", service chain addresses the requirements for both optimization of the network, through better utilization of resource and monetization, through the provisioning of services that are tailored to the customer specific needs.

SUMMARY

Generally, embodiments of the present disclosure relate to a method for service chain and the corresponding communication devices.

In a first aspect, embodiments of the disclosure provide a device. The device comprises at least one processor; and a memory coupled to the at least one processor, the memory storing instructions therein, the instructions, when executed by the at least one processor, causing the device to: receive, at the device and from a further device, a request for a service chain for an application served by the further device. The service chain comprises at least one service associated with the application and configured by the NEF device. The device is further caused to obtain a profile of the service chain, the profile comprising an identity of the application and a list of services for the application. The device is also caused to determine a target service chain based on the profile and the request.

In a second aspect, embodiments of the disclosure provide a device. The device comprises at least one processor; and a memory coupled to the at least one processor, the memory storing instructions therein, the instructions, when executed by the at least one processor, causing the device to: transmit, to a NEF device and at a further device, a request for a service chain for an application served by the further device. The service chain comprises at least one service associated with the application and configured by the further device. The device is also caused to receive, from the further device, a response to the request, the response indicating a target service chain, the target service chain being determined based on a profile and the request, the profile comprising an identity of the application and a list of services for the application.

In a third aspect, embodiments of the disclosure provide a device. The device comprises at least one processor; and a memory coupled to the at least one processor, the memory storing instructions therein, the instructions, when executed by the at least one processor, causing the device to: determine, at the device whether a profile of a service chain for an application needs to be updated, the profile comprising an identity of the application and a list of services for the application. The device is also caused to in response to the profile needs to be updated, update the profile based on a predetermined profile template.

In a fourth aspect, embodiments of the disclosure provide a method. The method comprises receiving, at a NEF device and from a communication device, a request for a service chain for an application served by the communication device. The service chain comprises at least one service associated with the application and configured by the NEF device. The method also comprises obtaining a profile of the service chain, the profile comprising an identity of the application and a list of services for the application. The method further comprises determining a target service chain based on the profile and the request.

In a fifth aspect, embodiments of the disclosure provide a method. The method comprises transmitting, to a NEF device and at a communication device, a request for a service chain for an application served by the communication device. The service chain comprises at least one service associated with the application and configured by the NEF device. The method further comprises receiving, from the NEF device, a response to the request, the response indicating a target service chain, the target service chain being determined based on a profile and the request, the profile comprising an identity of the application and a list of services for the application.

In a sixth aspect, embodiments of the disclosure provide a method. The method comprises determining, at a NRF device whether a profile of a service chain for an application needs to be updated, the profile comprising an identity of the application and a list of services for the application. The method also comprises in response to the profile needs to be updated, updating the profile based on a predetermined profile template.

In a seventh aspect, embodiments of the disclosure provide an apparatus. The apparatus comprises means for receiving, at a NEF device and from a communication device, a request for a service chain for an application served by the communication device. The service chain comprises at least one service associated with the application and configured by the NEF device. The apparatus also comprises means for obtaining a profile of the service chain, the profile comprising an identity of the application and a list of services for the application. The apparatus further comprises means for determining a target service chain based on the profile and the request.

In an eighth aspect, embodiments of the disclosure provide an apparatus. The apparatus comprises means for transmitting, to a NEF device and at a communication device, a request for a service chain for an application served by the communication device, the service chain comprising at least one service associated with the application and configured by the NEF device. The apparatus also comprises means for receiving, from the NEF device, a response to the request, the response indicating a target service chain, the target service chain being determined based on a profile and the request, the profile comprising an identity of the application and a list of services for the application.

In a ninth aspect, embodiments of the disclosure provide an apparatus. The apparatus comprises means for determining, at a NRF device whether a profile of a service chain for an application needs to be updated. The profile comprises an identity of the application and a list of services for the application. The apparatus further comprises means for in response to the profile needs to be updated, updating the profile based on a predetermined profile template.

In a seventh aspect, embodiments of the disclosure provide a computer readable medium. The computer readable medium stores instructions thereon, the instructions, when executed by at least one processing unit of a machine, causing the machine to implement the method according to the fourth aspect, fifth aspect or the sixth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
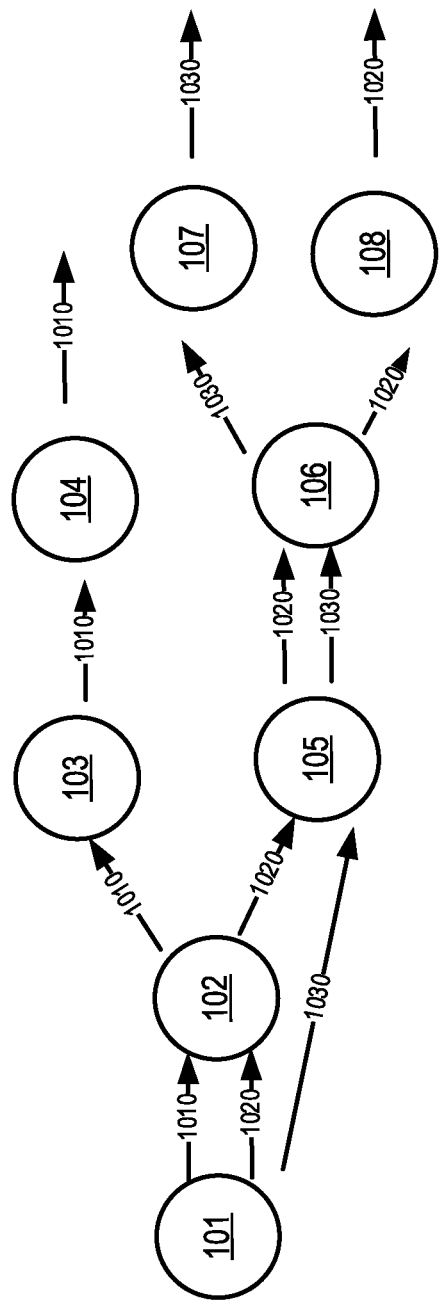
FIG. 1 illustrates a schematic diagram of service chains.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved Node (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with
software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As mentioned above, the technology of service chain has been proposed. The service chain provides a very flexible means for managing network traffic more intelligently with greatly agility. FIG. 1 illustrates a schematic diagram of the service chain. The services 101, 102, 103, 104, 105, 106, 107 and 108 are connected to other services via a network. As an example, FIG. 1 shows three service chains. The service chain 1010 may comprise the services 101, 102, 103 and 104. The service chain 1020 may comprise the services 101, 102, 105, 106 and 108. The service chain 1030 may comprise the services 101, 105, 106 and 107.

There are so many use cases for service chain that are well-understood across the industry. And most important, service chain is a horizontal capability that can support unlimited use cases. Table 1 below are only some examples:

TABLE 1

| Use Case | Description | Benefits |
| --- | --- | --- |
| Mobile Service Zone | Steer traffic through different VAS (value added service) | Easier and faster to add or remove service functions in the data path. Create per-subscriber or enterprise-specific services for better monetization of mobile data |

TABLE 1-continued

| Use Case | Description | Benefits |
| --- | --- | --- |
| Data Center Networking | Intra-data-center networking, e.g. for virtualized applications. Inter-data-center for service chain across locations or "inter-cloud" WAN service | Supports convergent service and business models across fixed and models across fixed and mobile assets |
| Enterprise WAN | Policy-based routing of user groups, enterprise applications, and cloud services through appropriate network functions | Dynamic service creation; enable upsell opportunities beyond simple connectivity; enable network service user-programmable. |

Figure 2:
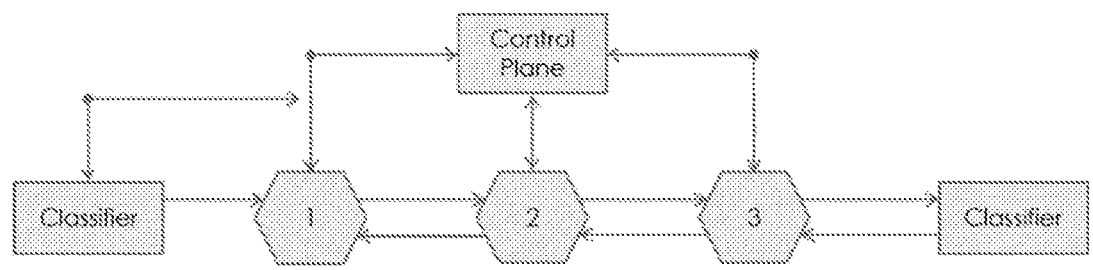
FIG. 2 illustrates a schematic diagram of an architecture of a service function chain.

Further, Service Function Chain (SFC) is the architecture under development in the IETF. FIG. 2 shows an example of the SFC Architecture. In recent research, it defines the 5G System Architecture as a Service Based Architecture, that is, a system architecture in which the system functionality is achieved by a set of Network Functions (NFs) providing services to other authorized NFs to access their services.

A NF service is one type of capability exposed by a NF which is an NF Service Producer to other authorized NF which is an NF Service Consumer through a service based interface. A NF service may support one or more NF service operation(s).

NFs may offer different functionalities and thus different NF services. Each of the NF services offered by a NF shall be self-contained, acted upon and managed independently from other NF services offered by the same NF (for example, for scaling, healing).

A Control Plane NF within the 5G Core network may expose its capabilities as services via its service based interface, which can be re-used by Control Plane Core Network (CN) NFs.

The NF service discovery enables a CN NFs to discover NF instance(s) that provide the expected NF service(s). Generally, the Network Repository Function (NRF) supports the following functionality: receives NF Discovery Request from NF instance, and provides the information of the discovered NF instances (be discovered) to the NF instance; maintains the NF profile of available NF instances and their supported services. Table 2 below shows some examples of NRF service operations.

TABLE 2

| Service Name | Service Operations | Operation Semantics | Example Consumer(s) |
| --- | --- | --- | --- |
| Nnrf_NFManagement | NFRegister | Request/Response | AMF, SMF, UDM, AUSF, NEF, PCF, SMSF, NSSF, UPF, BSF, CHF |
| | NFUpdate | Request/Response | AMF, SMF, UDM, AUSF, NEF, PCF, SMSF, NSSF, UPF, BSF, CHF |
| | NFDeregister | Request/Response | AMF, SMF, UDM, AUSF, NEF, PCF, SMSF, NSSF, UPF, BSF, CHF |
| | NFStatusSubscribe | Subscribe/Notify | AMF, SMF, PCF, NEF, NSSF, SMSF, AUSF, CHF, NRF |
| | NFStatusNotify | | AMF, SMF, PCF, NEF, NSSF, SMSF, AUSF, CHF |
| | NFStatusUnSubscribe | | AMF, SMF, PCF, NEF, NSSF, SMSF, AUSF, CHF, NRF |

TABLE 2-continued

| Service Name | Service Operations | Operation Semantics | Example Consumer(s) |
|---|---|---|---|
| Nnrf_NFDiscovery | Request | Request/Response | AMF, SMF, PCF, NEF, NSSF, SMSF, AUSF, CHF, NRF |
| Nnrf_AccessToken | Get | Request/Response | AMF, SMF, PCF, NEF, NSSF, SMSF, AUSF, UDM |

In order to properly maintain the information of available NF instances and their supported services, each NF instance informs the NRF of the list of NF services that it supports. The NF instance may also de-register from the NRF when it is about to gracefully shut down or disconnect from the network in a controlled way. External Exposure of Network Capability, which is supported by the Network Exposure Function (NEF), see the Table 3 below on NF Services provided by the NEF. The term "Network Exposure Function" used herein refers to a function that provides a means to securely expose the services and capabilities provided by 3GPP network functions and supports exposure of capabilities and events, secure provision of information from external application to 3GPP network, translation of internal/external information.

TABLE 3

| Service Name | Service Operations | Operation Semantics | Example Consumer(s) |
|---|---|---|---|
| Nnef_EventExposure | Subscribe | Subscribe/Notify | AF |
| | Unsubscribe | | AF |
| | Notify | | AF |
| Nnef_PFDManagement | Fetch | Request/Response | SMF |
| | Subscribe | Subscribe/Notify | SMF |
| | Notify | | SMF |
| | Unsubscribe | | SMF |
| | Create | Request/Response | AF |
| | Update | Request/Response | AF |
| | Delete | Request/Response | AF |
| Nnef_ParameterProvision | Update | Request/Response | AF |
| Nnef_Trigger | Delivery | Request/Response | AF |
| | DeliveryNotify | Subscribe/Notify | AF |
| Nnef_BDTPNegotiation | Create | Request/Response | AF |
| | Update | Request/Response | AF |
| Nnef_TrafficInfluence | Create | Request/Response | AF |
| | Update | Request/Response | AF |
| | Delete | Request/Response | AF |
| Nnef_ChargeableParty | Create | Request/Response | AF |
| | Update | Request/Response | AF |
| | Notify | Request/Response | AF |
| Nnef_AFsessionWithQoS | Create | Request/Response | AF |
| | Notify | Request/Response | AF |

Recently, there are a lot of applications in the current communication systems. However, applications support of current 5G system is far from to meet the demand of applications. Thus, there is a big gap should be filled.

Current 5G system is not able to support applications to take fully advantage of existing service capability from network, for example, security, firewall, intrusion prevention, Deep Packet Inspection (DPI), HTTP Header Enrichment, data optimization and catching, and the like. It requires applications to provide all necessary service in functionalities by itself, not to mention providing dynamic service base on the change of 5G network condition. Besides duplicate effort on both application and network, it makes hard for applications to change itself in time to respond market demand. Moreover, considering that the dynamic change of VAS (value added service) function with more and more new VAS NF are deployed, enabling dynamic service chain management in 5G system should also be supported. There may also be a big problem for operators to monetize their 5G network resource. Operator will lose much revenue opportunity if this problem is not solved.

According to embodiments of the present disclosure, dynamic service chain is achieved and the service chain request is transmitted from the application. Thus, a more flexible service chain is achieved. Further, according to embodiments of the present disclosure, management of service chain related to NF service is also achieved.

Figure 3:
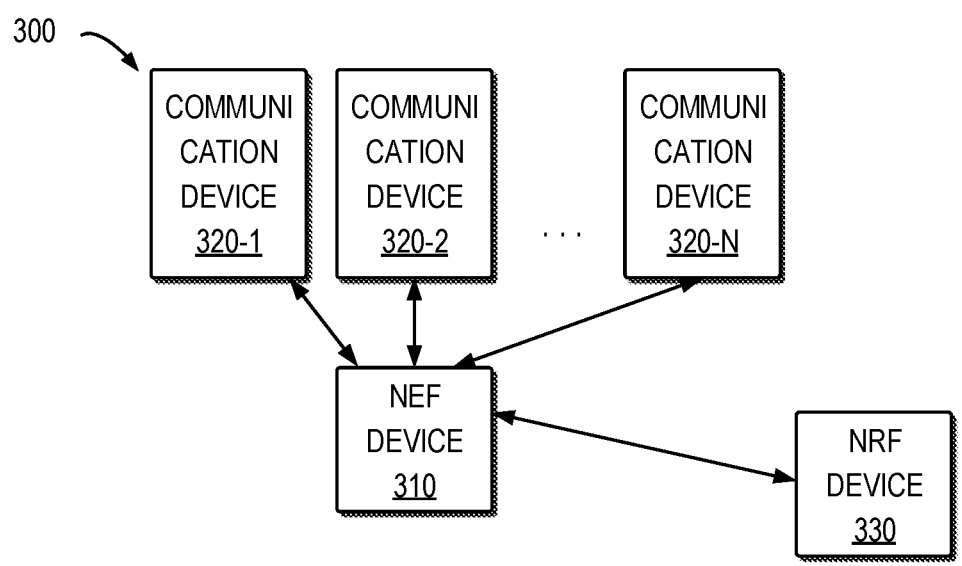
FIG. 3 illustrates a schematic diagram of a communication system according to embodiments of the present disclosure.

FIG. 3 illustrates a schematic diagram of a communication system 300 in which embodiments of the present disclosure can be implemented. The communication system 300, which is a part of a communication network, comprises a device 310 (also referred to as "the NEF device 310" hereinafter) which can support network exposure function. The communication system 300 comprises devices 320-1, 320-2, . . . , 320-N (collectively referred to as "the communication device 320") which serves applications. The communication system 300 may also comprise a device 330 (referred to as the "NRF device 330") which can support network repository function. It should be understood that the communication system 300 may also comprise other elements which are omitted for the purpose of clarity. It is to be understood that the numbers of terminal devices and network devices shown in FIG. 3 are given for the purpose of illustration without suggesting any limitations.

Communications in the communication system 300 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 4:
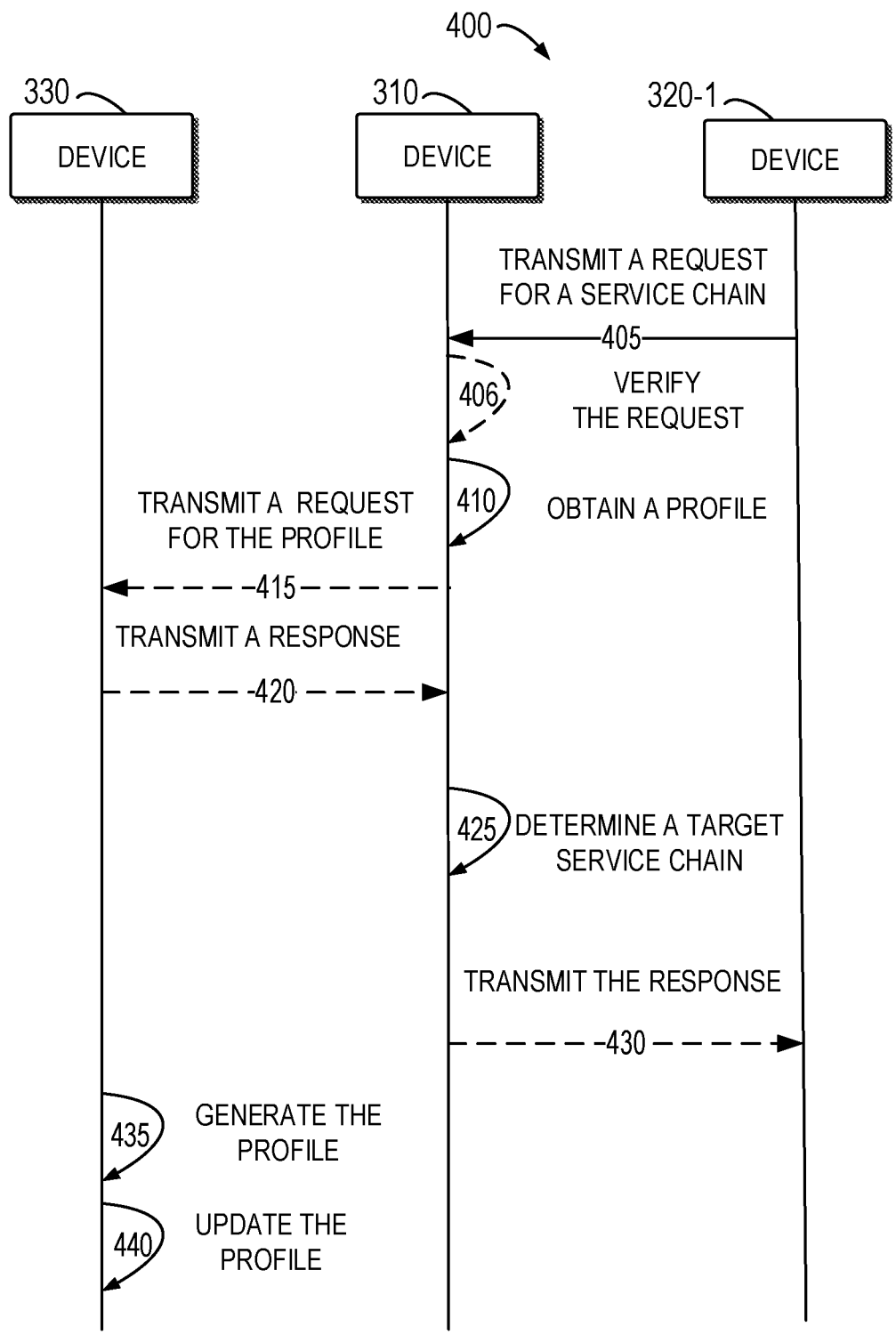
FIG. 4 illustrates a schematic diagram of interactions among devices according to embodiments of the present disclosure.

FIG. 4 illustrates a schematic diagram of interactions 400 in accordance with embodiments of the present disclosure. The interactions 400 may be implemented at any suitable devices. Only for the purpose of illustrations, the interactions 400 are described to be implemented at the NEF device 310, the communication device 320-1 and the NRF device 330.

Figure 5A:
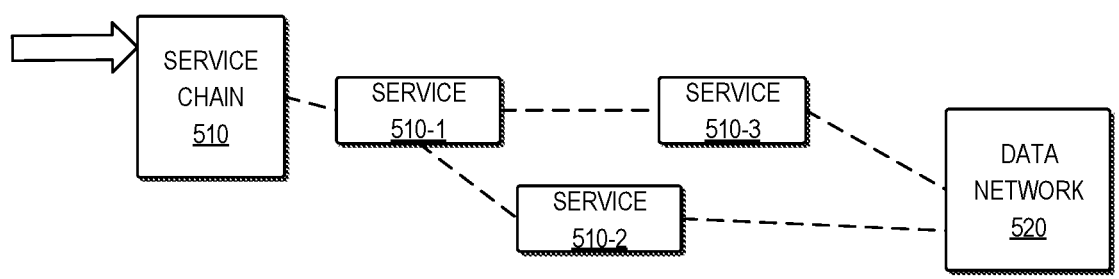
FIG. 5A illustrates a schematic diagram of a service chain according to embodiments of the present disclosure.

The communication device 320-1 transmits 405 a request for a service chain for an application to the NEF device 310. The application is served by the communication device 320-1. The request may comprise one or any combinations of: an identity of the application; information to identify the traffic for service chain; the requested service chain; an acceptable charging rate for the request service chain. The service chain may comprise one or more services associated with the application and may be configured by the NEF device 310. In this way, the application can request the service chain which improves the flexibility of the service chain. FIG. 5A illustrates a schematic diagram of a requested service chain. The service chain 510 may comprise identity information of services 510-1 and 510-3. The flow may be transmitted to the data network 520 after added with the services.

In some embodiments, the request may also comprise an indicator to indicate whether this service is mandatory or optional. In the scenario that service should be released from service chain, the identity of the service marked as optional may be selected. For example, if current charging rate exceeds acceptable charging rate or the service function overloads, the service marked as optional may be removed from the service chain. Alternatively, the request may be blank which means the communication device 320-1 wants the service chain suggestion from the NEF device 310.

Figure 5B:
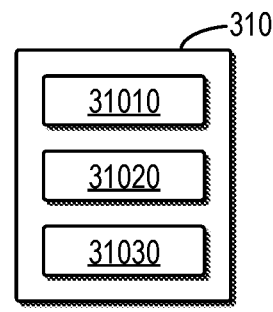
FIG. 5B illustrates a schematic diagram of a device according to embodiments of the present disclosure.

Only as an example, FIG. 5B illustrates a schematic diagram of the NEF device 310. The NEF device may comprise a module for service chain management 3010, a module for service chain advisor 3020 and a module for smart charging management 3030. It should be noted that the NEF device 310 may also comprise other modules. The module for service chain management 3010 may receive the request for the service chain from the communication device 320-1 and process the request. Details of the modules will be given later.

Referring back to FIG. 4, the NEF device 310 (for example, the module for service chain management 3010) may verify 406 whether the communication device 320-1 is authorized to request the service chain. If the NEF device 310 verifies that the communication device 320-1 is authorized, the NEF device 310 (for example, the module for service chain management 3010) obtains 410 the profile of the service chain. The profile comprises an identity of the application and a list of services for the application. In some embodiments, the profile may be retrieved from a database which is accessible by the NEF device 310. Alternatively, the NEF device 310 may transmit 415 a further request to the NRF device 330 to retrieve the profile from the NRF device 330. The NRF device 330 may transmit 420 a further response to the NEF device 310 which comprises the profile.

The profile may comprise one or any combinations of: available services; a charging rate for each service; mandatory services to be added into service chain for the application which is defined by the operator based on network knowledge; operator defined service chain for the application which is defined by the operator based on network knowledge; or available service chain functions. If the availability of one parameter is conditionally dependent on another parameter, the criteria of its availability should be associated with the parameter.

The NEF device 310 determines 425 the target service chain based on the profile and the request. In some embodiments, the NEF device 310 may determine the target service based on a condition of a connection between the first and the communication devices. For example, if the request is blank, the NEF device 310 may determine one or more services which are not congestion to be the target service chain.

In some embodiments, the NEF device 310 may determine whether the service chain is valid based on the profile. For example, if the identity of the one or more services in the request shows available in the profile, the NEF device 310 may determine that the service chain is valid. Alternatively or in addition, if the threshold of charging rate in the profile satisfies the acceptable charging rate in the request, the NEF device 310 may determine that the service chain is valid. In other embodiments, if the one or more services which are mandatory in the request are not missing, the NEF device 310 may determine that the service chain is valid. If the service chain is valid, the NEF device 310 may determine the requested service chain to be the target service chain.

In some embodiments, the request may comprise a predetermined policy for the service, for example, a set of service chain rules to define both criteria and service chain operation base on different connection conditions. Once the predetermined policy is accepted, the NEF device 310 may determine the target service chain based on the predetermined policy accordingly. For example, the predetermined policy may comprise any one or combinations of: providing different service chain for different traffic; providing different service chains once the charging rate is changed; introducing another service into the service chain if some pre-define event happens, for example, malicious attack, network congestion; or removing a service into the service chain if it's not needed after the connection conditions change.

The NEF device 310 may transmit 430 the response to the communication device 320-1. The request indicates the target chain. In some embodiments, there may be some negotiations between the NEF device 310 and the communication device 320-1. The NEF device 310 may transmit a candidate service chain to the communication device 320-1.

In some embodiments, the NEF device 310 (for example, the module for service chain advisor 3020) may provide one or more candidate service chains. For example, the NEF device 310 may provide the candidate service chain which comprises the services 510-1 and 510-2.

For example, if the application traffic is detected by network and there is no service chain for it or the service chain is not appropriate base on network knowledge, the NEF device 310 may provide the candidate service chain. Alternatively, if a new service is introduced into network, the NEF device 310 may provide the candidate service chain. In other embodiments, some predefined criteria may be matched (for example, malicious attack, network congestion, or quality of service (QoS) off the application is detected low by network, the NEF device 310 may provide the candidate service chain. In a further embodiment, if the service availability changes (for example, idle/low charging rate), the NEF device 310 may provide the candidate service chain. Alternatively, if the application service chain profile is updated, the NEF device 310 may provide the candidate service chain. The NRF device 330 may generate 430 the profile and/or update 435 the profile. Details regarding the generation and/or update the profiles will be given later.

In this way, it enables dynamic service chain management in 5G Service-Based Architecture and application to request service chain from 5G network. Further, it eliminates duplicate effort of application to implement the service that can be provided by network. It also enables application only focusing on the unique functionalities it should provide to end user and application-controlled service chain in 5G network. The service chain can be changed dynamically based on application needs once network condition is changed. It is much easier and faster to add or remove functionalities for application.

Figure 6:
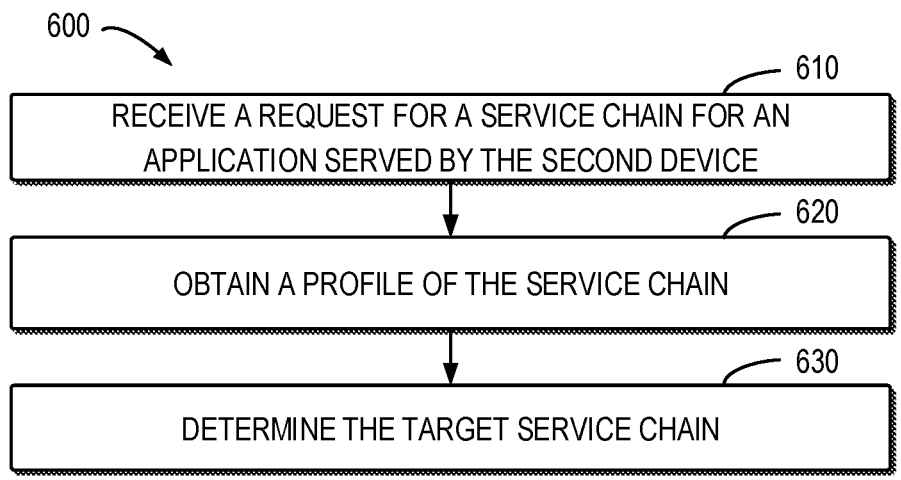
FIG. 6 illustrates a flow chart of a method implemented at a communication device according to embodiments of the present disclosure.

FIG. 6 illustrates a flow chart of a method 600 in accordance with embodiments of the present disclosure. The method 600 may be implemented at any suitable devices. Only for the purpose of illustrations, the method 600 is described to be implemented at the NEF device 310.

At block 610, the NEF device 310 receives a request for a service chain for an application to the NEF device 310. The application is served by the communication device 320-1. The request may comprise one or any combinations of: an identity of the application; information to identify the traffic for service chain; the requested service chain; an acceptable charging rate for the request service chain. The service chain may comprise one or more services associated with the application and may be configured by the NEF device 310.

In some embodiments, the request may also comprise an indicator to indicate whether this service is mandatory or optional. In the scenario that service should be released from service chain, the identity of the service marked as optional may be selected. For example, if current charging rate exceeds acceptable charging rate or the service function overloads, the service marked as optional may be removed from the service chain. Alternatively, the request may be blank which means the communication device 320-1 wants the service chain suggestion from the NEF device 310.

At block 620, the NEF device 310 obtains the profile of the service chain. The profile comprises an identity of the application and a list of services for the application. In some embodiments, the NEF device 310 may verify whether the communication device 320-1 is authorized to request the service chain. In some embodiments, the profile may be retrieved from a database which is accessible by the NEF device 310. Alternatively, the NEF device 310 may transmit a further request to the NRF device 330 to retrieve the profile from the NRF device 330. The NRF device 330 may transmit a further response to the NEF device 310 which comprises the profile.

The profile may comprise one or any combinations of: available services; a charging rate for each service; mandatory services to be added into service chain for the application which is defined by the operator based on network knowledge; operator defined service chain for the application which is defined by the operator based on network knowledge; or available service chain functions. If the availability of one parameter is conditionally dependent on another parameter, the criteria of its availability should be associated with the parameter.

At block 630, the NEF device 310 determines the target service chain based on the profile and the request. In some embodiments, the NEF device 310 may determine the target service based on a condition of a connection between the first and the communication devices. For example, if the request is blank, the NEF device 310 may determine one or more services which are not congestion to be the target service chain.

In some embodiments, the NEF device 310 may determine whether the service chain is valid based on the profile. For example, if the identity of the one or more services in the request shows available in the profile, the NEF device 310 may determine that the service chain is valid. Alternatively or in addition, if the threshold of charging rate in the profile satisfies the acceptable charging rate in the request, the NEF device 310 may determine that the service chain is valid. In other embodiments, if the one or more services which are mandatory in the request are not missing, the NEF device 310 may determine that the service chain is valid. If the service chain is valid, the NEF device 310 may determine the requested service chain to be the target service chain.

In some embodiments, the request may comprise a predetermined policy for the service, for example, a set of service chain rules to define both criteria and service chain operation base on different connection conditions. Once the predetermined policy is accepted, the NEF device 310 may determine the target service chain based on the predetermined policy accordingly. For example, the predetermined policy may comprise any one or combinations of: providing different service chain for different traffic; providing different service chains once the charging rate is changed; introducing another service into the service chain if some predefine event happens, for example, malicious attack, network congestion; or removing a service into the service chain if it's not needed after the connection conditions change.

In some embodiments, the NEF device 310 transmits the response to the communication device 320-1. The request indicates the target chain. In some embodiments, there may be some negotiations between the NEF device 310 and the communication device 320-1. The NEF device 310 may transmit a candidate service chain to the communication device 320-1.

In some embodiments, the NEF device 310 may provide one or more candidate service chains. For example, the NEF device 310 may provide the candidate service chain which comprises the services 510-1 and 510-2.

For example, if the application traffic is detected by network and there is no service chain for it or the service chain is not appropriate base on network knowledge, the NEF device 310 may provide the candidate service chain. Alternatively, if a new service is introduced into network, the NEF device 310 may provide the candidate service chain. In other embodiments, some predefined criteria may be matched (for example, malicious attack, network congestion, or quality of service (QoS) off the application is detected low by network, the NEF device 310 may provide the candidate service chain. In a further embodiment, if the service availability changes (for example, idle/low charging rate), the NEF device 310 may provide the candidate service chain. Alternatively, if the application service chain profile is updated, the NEF device 310 may provide the candidate service chain. In some embodiments, if the status of the communication device is changed, for example, the communication device 320-1 does not pay fees for the service chain, the NEF device 310 may transmit the candidate service chain.

In some embodiments, an apparatus for performing the method 600 (for example, the NEF device 310) may comprise respective means for performing the corresponding steps in the method 600. These means may be implemented in any suitable manners. For example, it can be implemented by circuitry or software modules.

In some embodiments, the apparatus comprises means for receiving, from a communication device, a request for a service chain for an application served by the communication device, the service chain comprising at least one service associated with the application and configured by the NEF device; means for obtaining a profile of the service chain, the profile comprising an identity of the application and a list of services for the application; means for determining a target service chain based on the profile and the request.

In some embodiments, the apparatus comprises means for transmitting, to the communication device, a response to the request, the response indicating the target service chain.

In some embodiments, the request comprises at least one of: an identity of the application, information to identify traffic for the service chain, an acceptable charging rate for the service chain, or an identity of the at least one service.

In some embodiments, the means for obtaining the profile for the service chain comprises: means for determining whether the communication device is authorized to request the service chain; and means for in response to determining that the communication device is authorized to request the service claim, retrieving the profile from a database accessible by the NEF device.

In some embodiments, the means for obtaining the profile of the service chain comprises: means for determining whether the communication device is authorized to request the service chain; means for in response to determining that the communication device is authorized to request the service claim, transmitting a further request to the profile to a NRF device; and means for receiving, from the NRF device, a further response to the further request comprising the profile.

In some embodiments, the means for determining the target service chain comprises: means for determining the target service chain based on a condition of a network connection.

In some embodiments, the means for determining the target service chain comprises: means for obtaining a predetermined policy for the service chain from the request; and means for determining the target service chain based on a condition of a network connection and the predetermined policy.

In some embodiments, the means for determining the target service chain comprises: means for determining whether the service chain is valid based on the profile; and means for in response to determining that the service chain is valid, determining the service chain to be the target service chain.

In some embodiments, the means for determining the service chain is valid comprises: means for in response to the identity of the at least one service is available, determining the service chain is valid; means for in response to a threshold of charge rate in the profile satisfying an acceptable charging rate in the request, determining the service chain is valid; or means for in response to the at least one of service in the request is not missing, determining the service chain is valid.

In some embodiments, the apparatus further comprises: means for transmitting a candidate service chain to the communication device in response to at least one of: the profile is updated, a new service is added, no available service chain for the application, or a status of the communication device is changed.

In some embodiments, the apparatus further comprises: means for receiving dynamic charging information from a fourth device connected with the NEF device; means for determining a new charging rate for the application based on the dynamic charging information of dynamic; and means for transmitting the new charging rate to the communication device in the response.

Figure 7:
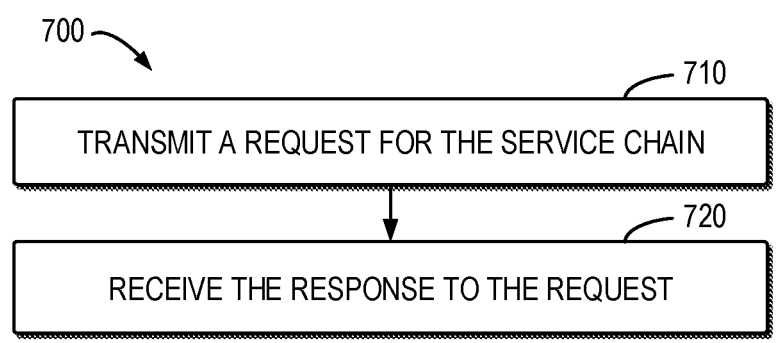
FIG. 7 illustrates a flow chart of a method implemented at a communication device according to embodiments of the present disclosure.

FIG. 7 illustrates a flow chart of a method 700 in accordance with embodiments of the present disclosure. The method 700 may be implemented at any suitable devices. Only for the purpose of illustrations, the method 700 is described to be implemented at the communication device 320-1.

At block 710, the communication device 320-1 transmits a request for a service chain for the application served by the communication device 320-1. The service chain comprises one or more services associated with the application and configured by the NEF device 310.

In some embodiments, the request may also comprise an indicator to indicate whether this service is mandatory or optional. In the scenario that service should be released from service chain, the identity of the service marked as optional may be selected. For example, if current charging rate exceeds acceptable charging rate or the service function overloads, the service marked as optional may be removed from the service chain. Alternatively, the request may be blank which means the communication device 320-1 wants the service chain suggestion from the NEF device 310.

In some embodiments, the request may comprise a predetermined policy for the service, for example, a set of service chain rules to define both criteria and service chain operation base on different connection conditions.

At block 720, the communication device 320-1 receives the response to the request. The response indicates a target service chain which is determined based on a profile and the request. The profile comprises an identity of the application and a list of services for the application.

The profile may comprise one or any combinations of: available services; a charging rate for each service; mandatory services to be added into service chain for the application which is defined by the operator based on network knowledge; operator defined service chain for the application which is defined by the operator based on network knowledge; or available service chain functions. If the availability of one parameter is conditionally dependent on another parameter, the criteria of its availability should be associated with the parameter.

In some embodiments, the communication device 320-1 may receive one or more candidate service chains. For example, if the application traffic is detected by network and there is no service chain for it or the service chain is not appropriate base on network knowledge, the communication device 320-1 may receive the candidate service chain. Alternatively, if a new service is introduced into network, the communication device 320-1 may receive the candidate service chain. In other embodiments, some predefined criteria may be matched (for example, malicious attack, network congestion, or quality of service (QoS) off the application is detected low by network, t the communication device 320-1 may receive the candidate service chain. In a further embodiment, if the service availability changes (for example, idle/low charging rate), t the communication device 320-1 may receive the candidate service chain. Alternatively, if the profile is updated, the communication device 320-1 may receive the candidate service chain. In some embodiments, if the status of the communication device is changed, for example, the communication device 320-1 does not pay fees for the service chain, the communication device 320-1 may receive the candidate service chain.

In some embodiments, the communication device 320-1 may receive information of the new charging rate. In other embodiments, the communication device 320-1 may also determine whether the target service chain is acceptable. For example, the communication device 320-1 may determine whether the charging rate in the response is acceptable. If the target service chain is acceptable, the communication device 320-1 may transmit an acknowledgement to the response. In other embodiments, if the target service chain is not acceptable, the communication device 320-1 may transmit another request to the service chain. For example, the other request may comprise the new acceptable charging rate.

In some embodiments, an apparatus for performing the method 700 (for example, the communication device 320) may comprise respective means for performing the corresponding steps in the method 700. These means may be implemented in any suitable manners. For example, it can be implemented by circuitry or software modules.

In some embodiments, the apparatus comprises means for transmitting, to a NEF device, a request for a service chain for an application served by the communication device, the service chain comprising at least one service associated with the application and configured by the NEF device; and means for receiving, from the NEF device, a response to the request, the response indicating a target service chain, the target service chain being determined based on an profile and the request, the profile comprising an identity of the application and a list of services for the application.

In some embodiments, the request comprises at least one of: the identity of the application, information to identify traffic for the service chain, an acceptable charging rate for the service chain, or an identity of the at least one service.

In some embodiments, the apparatus further comprises: means for receiving, from the NEF device, a candidate service chain, in response to at least one of: the profile is updated, a new service is added, or no available service chain for the application.

In some embodiments, the apparatus further comprises: means for receiving, to the communication device, information of a new charging rate; and means for determining a new acceptable charging rate based on the information of the new charging rate.

In some embodiments, the apparatus further comprises: means for determining whether the target service chain is acceptable; and means for in response to the target service chain is acceptable, transmitting an acknowledgment to the response.

In some embodiments, the apparatus further comprises: means for determining whether the target service chain is acceptable; and means for in response to the target service chain is unacceptable, transmitting another request to the service chain for the application.

Figure 8:
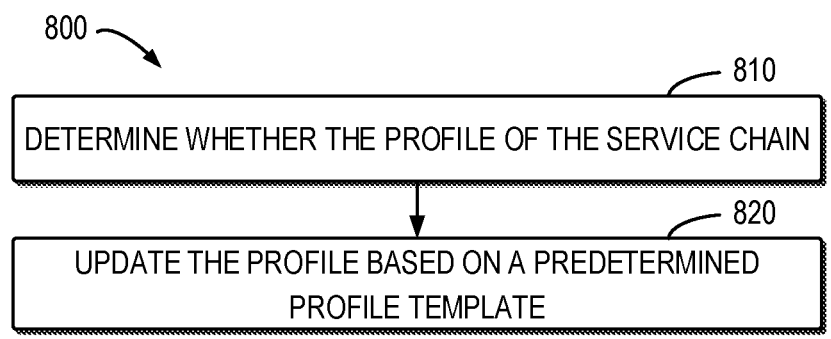
FIG. 8 illustrates a flow chart of a method implemented at a communication device according to embodiments of the present disclosure.

FIG. 8 illustrates a flow chart of a method 800 in accordance with embodiments of the present disclosure. The method 800 may be implemented at any suitable devices. Only for the purpose of illustrations, the method 800 is described to be implemented at the NRF device 330.

At block 810, the NRF device 330 determines, at a NRF device, whether a profile of a service chain for an application needs to be updated. The profile may include any one or any combinations: Service NF Type which identifies the service type provided by the VAS NF, for example, Firewall, WAN and application acceleration, Deep Packet Inspection (DPI), Lawful Intercept (LI), server load balancing, NAT44, NAT64, NPTv6,HOST_ID injection, HTTP Header Enrichment functions, and TCP optimizer, and the like; Service NF Name which is another implementation of VAS NF Type and is defined by Service NF provider to distinguish the same type Service NF provider by other vendors; Service Capability Information: indicates the capability of this NF on both computing capability (i.e. CPU, memory, network) and service capability, for example, supported protocols; application(s) Supported which indicate the identities of the application that can be supported.

In some embodiments, if there is a status change of a service in the service chain, the NRF device 330 determines that the profile of the service chain for the application needs to be updated. The status change may comprise a registration of the service. Alternatively or in addition, the status change may comprise an update of the service. In other embodiments, the status change may also comprise a deregistration of the service.

Alternatively or in addition, if there is a status change of the application supported, the NRF device 330 determines that the profile of the service chain for the application needs to be updated.

In other embodiments, if there is a reception of an update request from the communication device, the NRF device 330 determines that the profile of the service chain for the application needs to be updated. In some embodiments, if the predetermined profile template is changed, the NRF device 330 determines that the profile of the service chain for the application needs to be updated.

In some embodiments, if NF capacity is beyond predefine threshold (i.e. meets the service criteria), the Service NF should be included into the service chain profile. In another example, if NF charging rate is below the predefine threshold, the Service NF should be included into the Service chain profile.

In some embodiments, the Service NF list may also configurable base on the change of application capacity. For example, if new capacity (for example, a virtual reality video) is supported by this application, the list of Service NF Type and the list of mandatory Service NF Type may also be changed.

At block 820, the NRF device 330 updates the profile based on a predetermined profile template. The predetermined profile template may comprise any one or any combinations of: the identity of the application, the list of application capability, or a list of services for the application. In some embodiments, if there is no profile, the NRF device 330 may generate the profile based on the predetermined template.

For the scenario of the profile generation, that is, new application is supported or other NF request the profile for a new application identity, the NRF device 330 may fill in available Service NF based on the profile template and available Service NF registered on the NRF device 330. Alternatively, if there is no specific profile template defined for one application, default profile template may be used for profile generation.

The available service chain function is also included in the profile. Then, the communication device can contact the service chain function to apply service chain for the requested application.

For the scenario of the profile update, for example, service registration, the NRF device 330 may add the new registered service NF to existing profile if it meets the profile template.

In some embodiments, the NRF device 330 transmits the updated profile to the communication device 320-1. The NRF device 330 may transmit the updated profile to a NF Consumer device (for example, the NEF device 310) which transmits a request to the updated profile. Alternatively, the NRF device 330 may transmit the update profile to the NEF device 310 which has been subscribed the profile previously. In some embodiments, per request of the NF consumer (for example, the NEF device 310), the NRF device 330 may provide the profile by invoking either NRF discovery service (i.e. Nnrf_NFDiscovery) or a new service dedicated to service changing management. Alternatively, the NRF device 330 may notify the NF consumer (for example, the NEF device 310), which subscribed the change of service chain profile by invoking either NRF NFStatusNotify service or a new service dedicated to service changing management.

In some embodiments, the NRF device 330 may also support implicit Service Chaining Information Subscribing. The NRF device 330 may receive a register request from the NEF device 310. The register request may comprise the identity of the application. The NRF device 330 may determine that the NEF device 310 subscribes the profile of the application. The NRF device 330 may transmit the register response to the NEF device 310. The register response may comprise the profile of the application.

In some embodiments, if the profile is changed/updated, the NRF device 330 may transmit a notification to notify that the profile of the service chain is changed. The notification may also comprise the updated profile of the service chain. In other embodiments, if the NRF device 330 receives a deregister request from the firs device 310, the NRF device 330 may determine that the NEF device 310 unsubscribes the profile of the application.

In some embodiments, as mentioned above, the NF consumer device may request the service chain profile and the NRF 330 may determine the next hop based on service chain profile.

In other embodiments, the NF consumer device may provide more information in the request (for example, traffic identity for the application and/or the identity of the application), the NRF 330 may provide another service as the next hop directly based on network information associated with the application. For example, the network information may comprise service chain profile it maintained. The network information may comprise other network information.

In some embodiments, the NRF 330 may generate and/or update the profile of the application based on requests received from the NF Consumer device (for example, the VAS NF device). The request may comprise one of: a registration request, a deregistration request or a update request. If the NRF 330 receives the registration request from the NF Consumer device, the NRF 330 may determine that the NF Consumer device is able to provide service for the application. If the NRF 330 receives the deregistration request from the NF Consumer device, the NRF 330 may determine that the NF Consumer device is no longer able to provide service for the application. If the NRF 330 receives the update request from the NF Consumer device, the NRF 330 may determine that the NF Consumer device is updated for providing service for the application. The NRF 330 may generate and/or update the profile based on the request. For example, the NRF 330 may add the NF Consumer device into the profile as a service provider. Alternatively, the NRF 330 may remove the NF Consumer device from the profile as it deregisters from the NRF 330. In further embodiments, the NRF 330 may update profile since the NF Consumer device is updated.

In some embodiments, an apparatus for performing the method 800 (for example, the NRF device 330) may comprise respective means for performing the corresponding steps in the method 800. These means may be implemented in any suitable manners. For example, it can be implemented by circuitry or software modules.

In some embodiments, the apparatus comprises means for determining, at a NRF device whether a profile of a service chain for an application needs to be updated, the profile comprising an identity of the application and a list of services for the application; means for in response to the profile needs to be updated, updating the profile based on a predetermined profile template.

In some embodiments, the apparatus comprises means for transmitting the updated profile to the NEF device associated with the service chain.

In some embodiments, the means for determining whether the profile needs to be updated comprises: means for determining the profile needs to be updated, in response to at least one of: a status change of a service in the service chain, the status change comprising at least one of: a registration of the service, an update of the service, a deregistration of the service; a status change of the application supported; a reception of an update request from the communication device; or the predetermined profile template is changed.

In some embodiments, the predetermined profile template comprises at least one of: the identity of the application, the list of application capability, or a list of services for the application.

In some embodiments, the means for transmitting the updated profile to a communication device comprises: means for receiving a request from the communication device to trigger updating the profile; and means for transmitting a response to the request, the response comprising the updated profile.

In some embodiments, the request comprises at least one of: a discovery request to the service chain, or a subscribe request to the service chain.

In some embodiments, the means for transmitting the updated profile to a communication device comprises: means for determining that the communication device is associated with service chain; and means for transmitting a response to the request, the response comprising the updated profile.

In some embodiments, the apparatus further comprises: means for receiving a register request from a further device, the register request comprising the identity of the application; means for determining that the further device subscribes the profile of the application; and means for transmitting a register response to the register request, the register request comprising the profile of the application.

In some embodiments, the apparatus further comprises: means for in response to determining the profile being updated, transmitting a notification to indicate the profile is updated.

In some embodiments, the apparatus further comprises: means for receiving a deregister request from the further device, the register request comprising the identity of the application; and means for determining that the further device unsubscribes the profile of the application.

In some embodiments, the apparatus further comprises means for obtaining, from the request, at least one of: the identity of the application and traffic identity for the application; and means for determine a service for the application based on network information associated with the application.

In some embodiments, the apparatus further comprises: means for receiving a further request from a further Network Function (NF) Consumer device, the further request comprising one of: a registration request, a deregistration request or a update request; means for determining, based on further request, the further NF Consumer device is capable of providing a service for a further application; and means for generating a further profile of the further application based on further request.

Figure 9A:
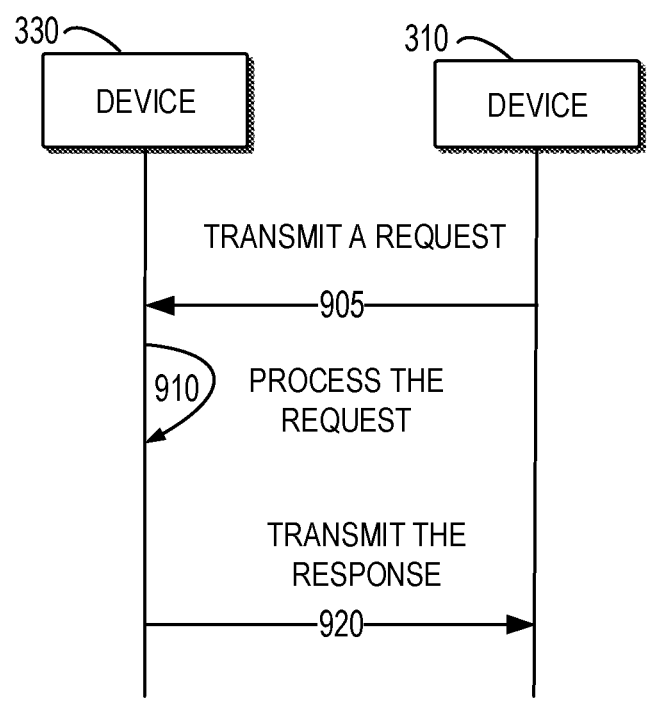
FIG. 9A illustrates a schematic diagram of interactions among devices according to embodiments of the present disclosure.

FIG. 9A shows a schematic diagram of interactions among devices according to embodiments of the present disclosure.

The NEF device 310 transmits 905 a request for the profile to the NRF device 330. In some embodiments, the communication device 320-1 may trigger the NEF device 310 to request the profile. For example, the Nnrf_NFDiscovery service operation may be used to support the discovery of service chain related information associated to the Application. In some embodiments, the NEF device 310 may transmit the request of Nnrf_NFDiscovery_Request which comprise the identity of the application. The request triggers the generation/update of the profile.

Alternatively, the above procedure can also be achieved using a new request service operation dedicated to service chain management for the same purpose. For example, in the scenario that service chain request handling from the NEF device 3101, once the NEF device 310 identify there is no profile for this application, Service Chain Discovery Procedure may apply for the generation/update of the profile.

In other embodiments, the NRF service operation (i.e. Nnrf_NFManagement_NFStatusSubscribe, Nnrf_NFManagement_NFStatusNotify, and Nnrf_NFManagement_NFStatusUnsubscribe) may be used to support the Subscribe/Notify of service chain information. It enables the NEF device 310 to subscribe the service chain information based on one or more target application identity.

Alternatively, the above procedure can also be achieved using a new Subscribe/Notify service operation dedicated to service chain management for the same purpose.

The NRF device 330 transmits 910 the response to the NRF device 330. The response indicates the profile. For example, the profile may be transmitted to the communication device 310 in the response of Nnrf_NFDiscovery_Request. Besides requesting/subscribing profile, this enhanced interface can also be used to request/subscribe the Service NF status directly in 5G network.

Figure 9B:
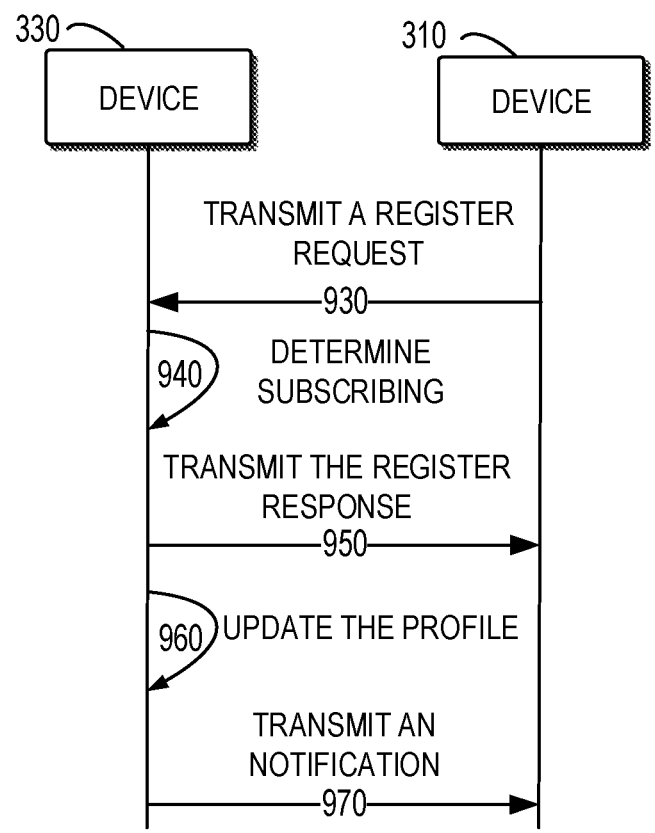
FIG. 9B illustrates a schematic diagram of interactions among devices according to embodiments of the present disclosure.

To improve the efficiency of dynamic service chain information providing to the NEF device 310, an implicit service chain information requesting/subscribing mechanism may be used. For example, FIG. 9B illustrates a schematic diagram of interactions regarding Implicit Service Chaining Information Subscribing among devices according to embodiments of the present disclosure.

In some embodiments, during NF registration at the NRF device 330, if indicated in the NF profile on the support of service chain, the service chain handling will also be triggered on NRF device 330 implicitly. The NEF device 310 may transmit 930 a register request (for example, Nnrf_NFManagment_NFRegister_request). The register request may comprise the identity of the application. The register request may also comprise other parameters of the service chain, for example, Service NF type, Service NF name.

In some embodiments, the NRF device 330 may process the register request and the service chain profile associated with the process. The NRF device 330 may determine 940 that the NEF device 310 subscribes the profile. The NRF device 330 may transmit 950 the register response to the NEF device. The register response comprises the service chain profile. In some embodiments, the identity of the Application (or other Service Chain parameters like VAS NF type, VAS NF name and the like) should also be provided in register response.

The NRF device 330 may update 960 the service chain profile. The NRF device 330 may transmit a notification if the subscribed service chain profile is updated. In some embodiments, the NEF device 310 may transmit a deregister request. The NRF device may determine that the NEF device 310 unsubscribe the profile of the application. In this way, an implicit of subscribing service chaining information has been achieved, thereby avoiding transmitting extra signalling.

Figure 10:
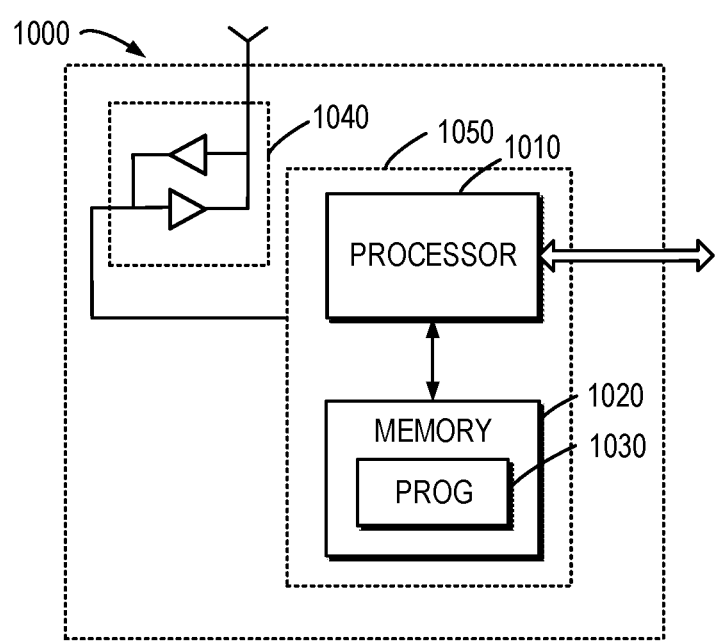
FIG. 10 illustrates a schematic diagram of a device according to embodiments of the present disclosure.

FIG. 10 is a simplified block diagram of a device 1000 that is suitable for implementing embodiments of the present disclosure. The device 1000 may be implemented at the NEF device 310. The device 700 may also be implemented at the communication devices 320-1. The device 1000 may also be implemented at the NRF devices 330. As shown, the device 1000 includes one or more processors 1010, one or more memories 1020 coupled to the processor(s) 1010, one or more transmitters and/or receivers (TX/RX) 1040 coupled to the processor 1010.

The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

Figure 11:
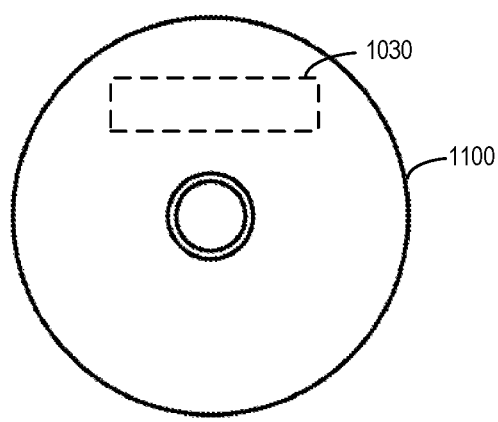
FIG. 11 shows a block diagram of an example computer readable medium in accordance with some embodiments of the present disclosure.

The memory 1020 stores at least a part of a program 1030. The device 1000 may load the program 1030 from the computer readable medium to the RAM for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements.

The program 1030 is assumed to include program instructions that, when executed by the associated processor 1010, enable the device 1000 to operate in accordance with the embodiments of the present disclosure, as discussed herein with reference to FIGS. 4 to 9B. That is, embodiments of the present disclosure can be implemented by computer software executable by the processor 1010 of the device 1000, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A Network Exposure Function (NEF) device, comprising:
   at least one processor; and
   a memory coupled to the at least one processor, the memory storing instructions therein, the instructions, when executed by the at least one processor, causing the NEF device to:
   receive, from a communication device, a request for a service chain for an application served by the communication device, the service chain comprising at least one service associated with the application and configured by the NEF device;
   obtain a profile of the service chain, the profile comprising an identity of the application and a list of services for the application; and
   determine a target service chain based on the profile and the request.

2. The NEF device of claim 1, wherein the request comprises at least one of:
   the identity of the application,
   information to identify a traffic for the service chain,
   an acceptable charging rate for the service chain, or
   an identity of the at least one service.

3. The NEF device of claim 2, wherein the NEF device is caused to determine the target service chain by:
   determining the target service chain based on a condition of a network connection;
   determining the target service chain based on a condition of the network connection and a predetermined policy for the service chain, the predetermined policy being obtained from the request; or
   in response to determining that the service chain is valid, determining the service chain to be the target service chain, and wherein the NEF device is further caused to determine the target service chain by:
   in response to the identity of the at least one service is available, determining the service chain is valid;
   in response to a threshold of charge rate in the profile satisfying an acceptable charging rate in the request, determining the service chain is valid; or
   in response to the at least one of service in the request is not missing, determining the service chain is valid.

4. The NEF device of claim 1, wherein the NEF device is caused to obtain the profile for the service chain by:
   in response to determining that the communication device is authorized to request the service claim, transmitting a further request to the profile to a Network Repository Function (NRF) device; and
   receiving, from the NRF device, a further response to the further request comprising the profile; and wherein the NEF device is caused to determine the target service chain by:
   determining the target service chain based on a condition of a network connection;
   determining the target service chain based on a condition of the network connection and a predetermined policy for the service chain, the predetermined policy being obtained from the request; or
   in response to determining that the service chain is valid, determining the service chain to be the target service chain.

5. A communication device, comprising:
   at least one processor; and
   a memory coupled to the at least one processor, the memory storing instructions therein, the instructions, when executed by the at least one processor, causing the communication device to:
   transmit, to a Network Exposure Function (NEF) device, a request for a service chain for an application served by the communication device, the service chain comprising at least one service associated with the application and configured by the NEF device; and
   receive, from the NEF device, a response to the request, the response indicating a target service chain, the target service chain being determined based on a profile and the request, the profile comprising an identity of the application and a list of services for the application.

6. The communication device of claim 5, wherein the request comprises at least one of:
an identity of the application,
information to identify a traffic for the service chain,
an acceptable charging rate for the service chain, or
an identity of the at least one service.

7. The communication device of claim 5, wherein the communication device is further caused to:
receive, from the NEF device, a candidate service chain, in response to at least one of:
the profile is updated,
a new service is added, or
no available service chain for the application, and
wherein the communication device is further caused to:
in response to the target service chain is acceptable, transmit an acknowledgment to the response; or
in response to the target service chain is unacceptable, transmit another request to the service chain for the application.

8. A Network Repository Function (NRF) device, comprising:
at least one processor; and
a memory coupled to the at least one processor, the memory storing instructions therein, the instructions, when executed by the at least one processor, causing the NRF device to:
determine whether a profile of a service chain for an application needs to be updated, the profile comprising an identity of the application and a list of services for the application; and
in response to determining that the profile needs to be updated, update the profile based on a predetermined profile template;
wherein the NRF device is caused to determine whether the profile needs to be updated by:
determining the profile needs to be updated, in response to at least one of:
a status change of a service in the service chain, the status change comprising at least one of: a registration of the service, an update of the service, a deregistration of the service;
a status change of the application supported;
a reception of an update request from a Network Function (NF) Consumer device; or
the predetermined profile template is changed.

9. The NRF device of claim 8, wherein the NRF device is further caused to transmit the updated profile to a Network Function (NF) Consumer device by:
receiving a request from the NF Consumer device to trigger updating the profile; and
transmitting a response to the request, the response comprising the updated profile;
and wherein the NRF device is further caused to:
receive a register request from a Network Function (NF) Consumer device, the register request comprising the identity of the application;
determine that the NF Consumer device subscribes the profile of the application;
transmit a register response to the register request, the register request comprising the profile of the application;
in response to determining the profile being updated, transmit a notification to notify the profile is updated;
obtain, from the request, at least one of: the identity of the application and traffic identity for the application; and
determine a service for the application based on network information associated with the application.

10. A method comprising:
receiving, at a Network Exposure Function (NEF) device and from a communication device, a request for a service chain for an application served by the communication device, the service chain comprising at least one service associated with the application and configured by the NEF device;
obtaining a profile of the service chain, the profile comprising an identity of the application and a list of services for the application; and
determining a target service chain based on the profile and the request.

11. The method of claim 10, wherein obtaining the profile of the service chain comprises:
in response to determining that the communication device is authorized to request the service claim, transmitting a further request to the profile to a Network Repository Function (NRF) device; and
receiving, from the NRF device, a further response to the further request comprising the profile; and wherein determining the target service chain comprises:
determining the target service chain based on a condition of a network connection;
determining the target service chain based on a condition of the network connection a predetermined policy, the predetermined policy being obtained from the request; or
in response to determining that the service chain is valid, determining the service chain to be the target service chain.

12. The method of claim 11, wherein determining the service chain is valid comprises:
in response to the identity of the at least one service is available, determining the service chain is valid;
in response to a threshold of charge rate in the profile satisfying an acceptable charging rate in the request, determining the service chain is valid; or
in response to the at least one of service in the request is not missing, determining the service chain is valid.

13. A non-transitory computer readable medium storing instructions thereon, the instructions, when executed by at least one processing unit of a machine, causing the machine to perform the method according to claim 10.

14. A method, comprising:
transmitting, to a Network Exposure Function (NEF) device, a request for a service chain for an application served by a communication device, the service chain comprising at least one service associated with the application and configured by the NEF device; and
receiving, from the NEF device, a response to the request, the response indicating a target service chain, the target service chain being determined based on a profile and the request, the profile comprising an identity of the application and a list of services for the application.

15. The method of claim 14, further comprising:
receiving, from the NEF device, a candidate service chain, in response to at least one of:
the profile is updated,
a new service is added, or
no available service chain for the application;
the method further comprising:
in response to the target service chain is acceptable, transmitting an acknowledgment to the response; or
in response to the target service chain is unacceptable, transmitting another request to the service chain for the application.

16. A method, comprising:
- determining, at a Network Repository Function (NRF) device, whether a profile of a service chain for an application needs to be updated, the profile comprising an identity of the application and a list of services for the application; and
- in response to the profile needs to be updated, updating the profile based on a predetermined profile template;
- wherein determining whether the profile needs to be updated comprises:
- determining the profile needs to be updated, in response to at least one of:
- a status change of a service in the service chain, the status change comprising at least one of: a registration of the service, an update of the service, a deregistration of the service;
- a status change of the application supported;
- a reception of an update request from a Network Exposure Function (NEF) device; or
- the predetermined profile template is changed.

17. The method of claim 16, wherein transmitting the updated profile to a Network Exposure Function (NEF) device comprises:
- receiving a request from the NEF device to trigger updating the profile; and
- transmitting a response to the request, the response comprising the updated profile;
- the method further comprising:
- receiving a register request from a Network Exposure Function (NEF) device, the register request comprising the identity of the application;
- determining that the NEF device subscribes the profile of the application;
- transmitting a register response to the register request, the register request comprising the profile of the application;
- in response to determining the profile being updated, transmitting a notification to notify the profile is updated.

18. A Network Exposure Function (NEF) apparatus, comprising:
- means for receiving, from a communication apparatus, a request for a service chain for an application served by the communication apparatus, the service chain comprising at least one service associated with the application and configured by the NEF apparatus;
- means for obtaining a profile of the service chain, the profile comprising an identity of the application and a list of services for the application; and
- means for determining a target service chain based on the profile and the request.

19. A communication apparatus, comprising:
- means for transmitting, to a Network Exposure Function (NEF)apparatus , a request for a service chain for an application served by the communication apparatus, the service chain comprising at least one service associated with the application and configured by the NEF apparatus; and
- means for receiving, from the NEF apparatus, a response to the request, the response indicating a target service chain, the target service chain being determined based on a profile and the request, the profile comprising an identity of the application and a list of services for the application.

20. A Network Repository Function (NRF) apparatus, comprising:
- means for determining, at the NRF apparatus whether a profile of a service chain for an application needs to be updated, the profile comprising an identity of the application and a list of services for the application; and
- means for in response to the profile needs to be updated, updating the profile based on a predetermined profile template.

* * * * *